A. L. LASNIER.
SPRING TIRE.
APPLICATION FILED JAN. 29, 1921.
1,390,143. Patented Sept. 6, 1921.
2 SHEETS—SHEET 1.
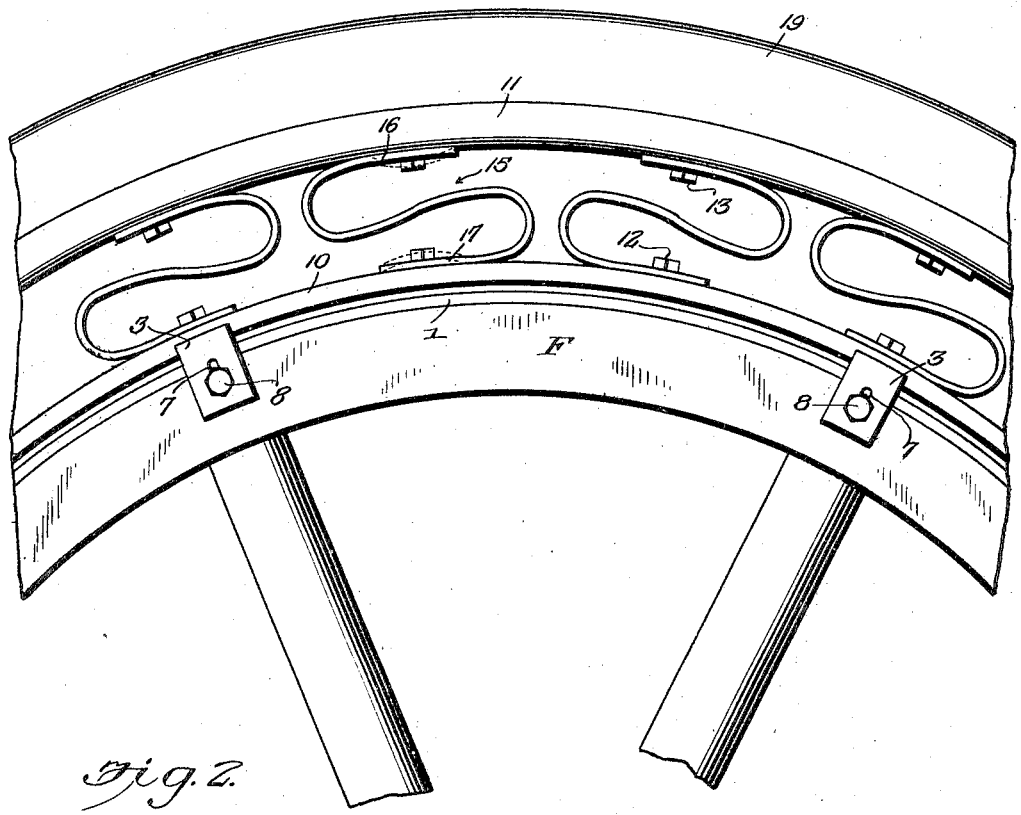
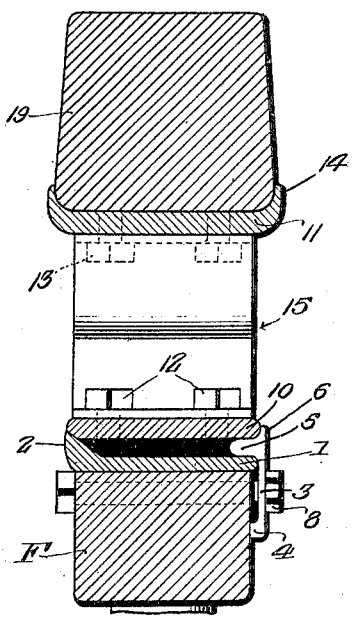
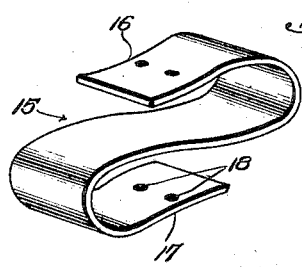
Inventor
Arthur L. Lasnier,
By
Geo. F. Kimmel, Attorney

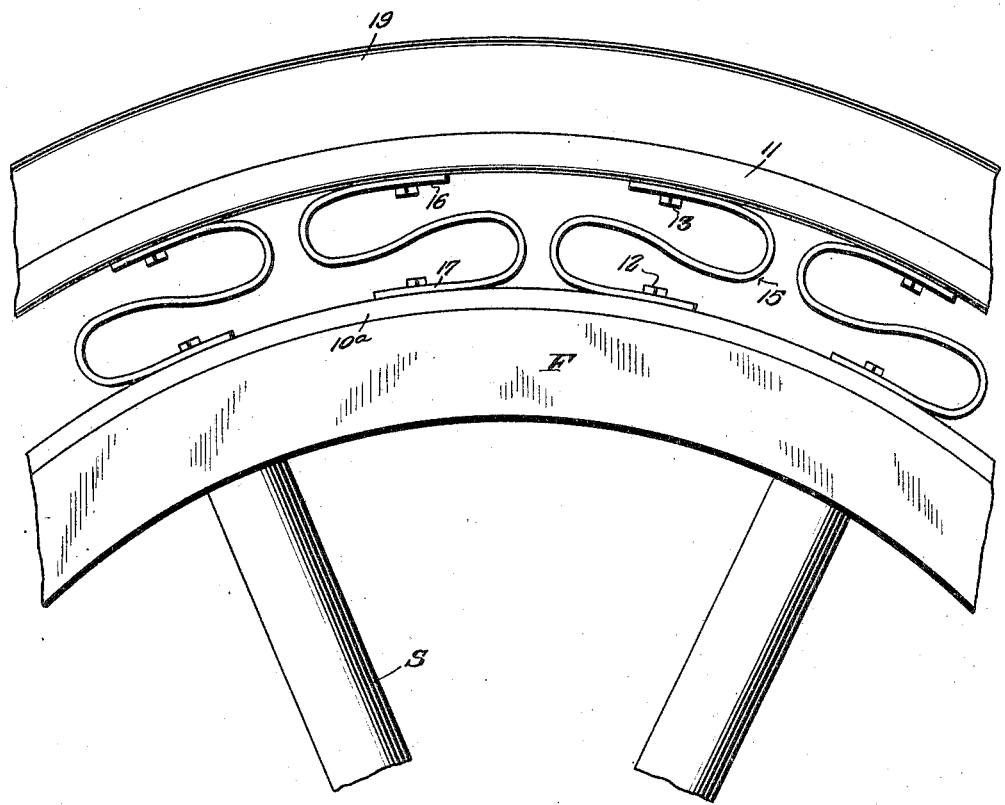
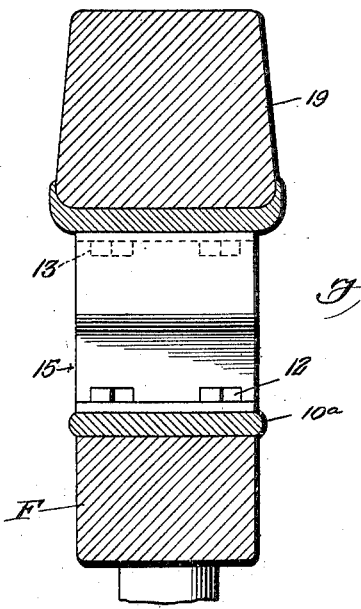
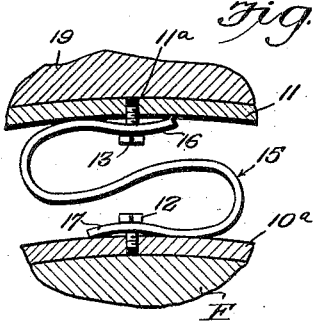

UNITED STATES PATENT OFFICE.

ARTHUR L. LASNIER, OF BRISTOL, CONNECTICUT.

SPRING-TIRE.

1,390,143. Specification of Letters Patent. Patented Sept. 6, 1921.

Application filed January 29, 1921. Serial No. 441,041.

*To all whom it may concern:*

Be it known that I, ARTHUR L. LASNIER, a subject of the King of England, residing at Bristol, in the county of Hartford and State of Connecticut, have invented certain new and useful Improvements in a Spring-Tire, of which the following is a specification.

This invention relates to cushion tires for vehicles and the object thereof is to provide a tire of this character which may be used either as a detachable or a permanent tire and the springs of which are so constructed as to provide locking washers at their points of attachment.

Another object is to so construct and arrange the springs that their strength will be equalized or rendered uniform.

With these and other objects in view, the invention consists in certain novel features of construction as hereinafter shown and described and specifically pointed out in the claim.

In the accompanying drawing:

Figure 1 represents a side elevation of a portion of a wheel equipped with but one form of this improved tire.

Fig. 2 is a detail transverse section thereof.

Fig. 3 is a detail perspective view of one of the springs employed in the construction of the tire.

Fig. 4 is a view similar to Fig. 1 showing a slightly different form of applying the invention.

Fig. 5 is a transverse section thereof, and,

Fig. 6 is a detail longitudinal section showing the mounting of one of the springs.

In the form shown in Figs. 1, 2 and 3 a detachable tire is illustrated and mounted on the usual felly F of an ordinary wheel. The felly F has a metal rim 1 mounted thereon and provided on its inner edge with a flange 2 the inner wall of which is disposed at an oblique angle and designed to form a seat for the inner rim member 10 which constitutes a part of the tire forming this invention.

Clamps 3 are shown for detachably connecting the tire to the felly F and each is composed of a plate or body member having an inturned flange 4 at its inner end with a similar flange 5 at its other end which is designed to be inserted between the unflanged edge of the rim 1, and the adjacent face of rim 10 as is shown clearly in Fig. 2. The plate or body of the clamp 1 extends beyond the rib 5 as shown at 6 and is designed to engage the outer edge of the rim 10 to hold said rim clamped against the flange 2 of rim 1. These clamps 3 are each provided with a longitudinally extending slot 7 to receive attaching bolts 8 which pass transversely through the felly F adjacent its periphery and adjustably connect the clamps thereto.

The detachable tire proper comprises the inner metal rim 10 and an outer radially spaced rim 11 between which are arranged the springs 15 which are secured to said rim in a manner presently to be described. The outer rim 11 is provided at its opposite edges with outturned flanges 14 to form a seat between them for a tread member 19 which although preferably constructed of rubber may be formed of any other suitable material.

The springs 15 any desired number of which may be employed are shown substantially S-shaped in form being constructed of spring metal strips and the opposed ends 16 and 17 of said springs are bowed inwardly as shown clearly in Fig. 6 and are apertured as shown at 18 for the reception of the securing screws 12 and 13 which are engaged with the rims 10 and 11 and when screwed home flatten out the bowed ends of the spring which operate then as locking washers to hold the screws securely in operative engagement with the rims 10 and 11.

The springs 15 are preferably arranged in pairs as shown in Figs. 1 and 4 one facing in one direction and one in the other to equalize or render the strength thereof uniform.

In Figs. 4, 5 and 6 the tire is similar to that shown in Figs. 1 to 3 except that the inner rim 10$^a$ is permanently secured to the felly F by the bolts or screws 12 which connect the spring to rim 10$^a$.

It is to be understood that there is an even number of these springs 15 arranged around the tire and as above described; they are applied or assembled in pairs.

The inner face of rim 11 and the outer face of rim 10 at points where the springs are connected are made rectilinear so that the spring ends may be secured to said rims in close contact therewith.

By constructing the springs 15 in substantially S-shaped form with elongated loops and making them of spring steel or any other metal they are rendered flexible backward and forward but rigid laterally. Each operates as a compression spring and as an expansion spring.

From the above description it will be seen that a tire constructed as shown and described will be resilient and sensitive and yet will have none of the disadvantages of a pneumatic tire and should one of the springs be broken or injured in any way it may be quickly removed and another substituted.

The preferred embodiment of the invention is disclosed in the drawings and set forth in the specification, but it will be understood that any modifications within the scope of the claimed invention may be made in the construction without departing from the principle of the invention or sacrificing any of its advantages.

What I claim is:

A resilient vehicle tire composed of radially spaced wheel rims connected by a series of springs, each spring being composed of a metal strip bent to form parallel ovate loops of uniform size, arranged to open in opposite directions with the terminals thereof bowed inwardly and provided at the crown of said bowed portions with fastener receiving apertures, whereby said ends operate as lock washers when forced into engagement with the rim.

In testimony whereof I affix my signature hereto.

ARTHUR L. LASNIER.